(12) United States Patent
van der Huizen

(10) Patent No.: US 9,840,574 B2
(45) Date of Patent: Dec. 12, 2017

(54) BRANCHED BROAD MWD CONJUGATED DIENE POLYMER

(71) Applicant: Kraton Polymers U.S. LLC, Houston, TX (US)

(72) Inventor: Adriaan Albert van der Huizen, Castricum (NL)

(73) Assignee: Kraton Polymers U.S. LLC, Houston, TX (US)

( * ) Notice: Subject to any disclaimer, the term of this patent is extended or adjusted under 35 U.S.C. 154(b) by 271 days.

(21) Appl. No.: 14/712,529

(22) Filed: May 14, 2015

(65) Prior Publication Data

US 2016/0333128 A1    Nov. 17, 2016
US 2017/0114172 A9    Apr. 27, 2017

(30) Foreign Application Priority Data

May 16, 2014 (NL) .................................. 2012828

(51) Int. Cl.
*C08L 9/10*    (2006.01)
*C08F 236/10*    (2006.01)

(52) U.S. Cl.
CPC .............. *C08F 236/10* (2013.01); *C08L 9/10* (2013.01)

(58) Field of Classification Search
CPC ................................. C08F 236/10; C08L 9/10
USPC ......................................................... 524/573
See application file for complete search history.

(56) References Cited

U.S. PATENT DOCUMENTS

| | | |
|---|---|---|
| 4,894,397 A | 1/1990 | Morgan et al. |
| 2003/0176582 A1 | 9/2003 | Bening et al. |
| 2004/0054110 A1* | 3/2004 | Grun ............... C08C 19/44 526/335 |

FOREIGN PATENT DOCUMENTS

| | | |
|---|---|---|
| CN | 1133852 A | 10/1996 |
| CN | 102361885 A | 2/2012 |
| CN | 103374101 A | 10/2013 |
| GB | 0813198 A | 5/1959 |
| JP | 62011715 A * | 1/1987 |
| WO | 2007110417 A1 | 10/2007 |
| WO | 2008074513 A1 | 6/2008 |
| WO | 2010005859 A2 | 1/2010 |

OTHER PUBLICATIONS

Endo, T., Ohshima, A., Akira, N., Nomura, R., Mizutani, Y., "Synthesis of networked polystyrene endowed with nucleophilic reaction sites by the living anionic polymerization techniques", J. Poly. Sci., Part A, Polymer Chemistry, (2000) pp. 2543-2547, 38(14).

* cited by examiner

*Primary Examiner* — Kelechi Egwim

(74) *Attorney, Agent, or Firm* — Ekatherina Serysheva

(57) ABSTRACT

A process is provided for preparing a branched conjugated diene polymer with a molecular weight distribution Mw/Mn of at least 1.1, by anionic polymerization, comprising the following reaction steps: a) polymerizing a mixture of monomers comprising at least one conjugated diene and optionally one or more monoalkenyl arene compounds in the presence of an anionic initiator to form a living polymer; b) terminating the polymerization; and c) optionally functionalizing and/or hydrogenating the polymer so produced, wherein the mixture of monomers comprises an alpha, omega-bis(vinylphenyl)alkane as comonomer. The invention further relates to the polymer so obtained, a latex prepared therefrom, the latex, and articles made from the latex.

14 Claims, No Drawings

BRANCHED BROAD MWD CONJUGATED DIENE POLYMER

TECHNICAL FIELD

The current invention concerns branched broad molecular weight conjugated diene polymers and polyisoprene in particular and a process for preparing the same. It also concerns a latex of the branched broad MWD conjugated diene polymer and products made therefrom (dipped goods).

BACKGROUND TO THE INVENTION

Natural rubber, also called India rubber or caoutchouc, as initially produced, consists of suitable polymers of the organic compound isoprene, with minor impurities of other organic compounds plus water. Forms of polyisoprene that are useful as natural rubbers are classified as elastomers.

The main constituent of NR is cis-polyisoprene, with a molecular weight of 100,000 to 1,000,000 daltons. It is the combination of the high cis content, the high average molecular weight, a minor but essential amount of branching and the relatively broad molecular weight distribution that give natural rubber unique properties. The feel and touch of dipped goods like condoms and surgical gloves are much appreciated.

Some people have a serious latex allergy, and exposure to natural latex rubber products such as latex gloves can cause anaphylactic shock. For this and other reasons dipped goods made from synthetic rubber based on polyisoprene are popular.

For instance, Cariflex™ polyisoprene products are the ideal alternative to natural rubber for applications that demand extreme purity, exceptional protection and consistently high quality. Cariflex products, supplied by Kraton Polymers offer a pure and versatile option for manufacturing applications that require the high tensile strength and tear resistance of natural rubber without the impurities that cause discoloration, odor and allergic reactions.

When made by anionic polymerization, polyisoprene is made without the allergens. The molecular weight is relatively high as is the cis content. However, in anionic polymerization a relatively sharp molecular weight distribution is achieved (Mw/Mn of about 1.0) and a nearly linear polymer structure is obtained. To achieve the same properties as NR, some broadening of the molecular weight distribution (wherein the expression "broad MWD" refers to Mw/Mn greater than 1.0, preferably at least 1.1, more preferably at least 1.5) and some branching is necessary. On the other hand, gelation (cross-linking) should be avoided. It has been found problematic to achieve these requirements when preparing a conjugated diene polymer such as polyisoprene by anionic polymerization. Polyisoprene may also be made by other processes, but then the polymer is neither clear nor free of allergens.

SUMMARY OF THE INVENTION

It has now been found that a branched broad MWD conjugated diene polymer can be made by anionic polymerization that more closely resembles the main constituent of NR, i.e., a polyisoprene with a high cis content, a relatively broad molecular weight distribution and with some branching, without gelation.

Accordingly, a process is provided for preparing a branched, broad molecular weight conjugated diene polymer by anionic polymerization, comprising the following reaction steps:

d) polymerizing a mixture of monomers comprising at least one conjugated diene and optionally one or more monoalkenyl arene compounds in the presence of an anionic initiator to form a living polymer;

e) terminating the polymerization, and f) optionally functionalizing and/or hydrogenating the polymer so produced, wherein the mixture of monomers comprises an alpha, omega-bis(vinylphenyl)alkane as comonomer, preferably 1,2-bis(vinylphenyl)ethane.

Also provided is a process to convert the branched, broad molecular weight conjugated diene polymer into a latex.

A further embodiment of the invention concerns the branched, broad molecular weight conjugated diene polymer so prepared, the latex so prepared, and dipped goods made from the latex.

DETAILED DESCRIPTION OF THE INVENTION

The synthesis of polyisoprene by anionic polymerization is well-known. An early example is GB Pat. No. 813198. Thus, isoprene is polymerized in the presence of a hydrocarbon lithium or polylithium to give a rubbery, essentially cis 1,4-polyisoprene.

Thus, living polymers may be prepared by anionic solution polymerization of conjugated dienes and monomer mixtures in the presence of an alkali metal or an alkali-metal hydrocarbon, e.g. sodium naphthalene, as anionic initiator. The preferred initiator is lithium or a monolithium hydrocarbon. Many lithium hydrocarbons are suitable, wherein the hydrocarbon contains from 1 to 40 carbon atoms and in which lithium has replaced one or more hydrogen atoms. It should be understood that in addition to monovalent lithium compounds such as alkyl lithium compounds, also dilithium and polylithium compounds may be used, as well as mixtures of hydrocarbon lithium compounds. Particularly advantageous are for instance alkyl lithium compounds such as methyl lithium, ethyl lithium, n-butyl lithium, s-butyl lithium ("s-BuLi"), hexyl lithium, 2-ethylhexyl lithium, n-hexadecyl lithium and the like. Particularly preferred is s-BuLi as sole initiator.

The concentration of the initiator used to prepare the living polymer may vary between wide limits and is determined by the desired molecular weight of the living polymer. For conjugated diene polymers, the hydrocarbon lithium based initiator is usually employed in concentrations of 10 to 2000 ppm Li, preferably 100 to 1000 ppm Li based on the weight of the diene monomer. The initiators may be added to the polymerization mixture in two or more stages optionally together with additional monomer.

The conditions for producing polymers by anionic polymerization in the presence of a lithium-based initiator are well-known in the art. Typically, solvent, initiator and monomer(s) are first made free of chemical impurities, moisture and air, all of which adversely impact the polymerization. The monomer(s) should be at least 90 mole % pure. The purified streams enter a reactor or chain of reactors into which the initiator is injected, and the polymerization begins.

The living polymer obtained by reaction step (a), which is a linear unsaturated living polymer, is prepared from one or more conjugated dienes, e.g. $C_4$ to $C_{12}$ conjugated dienes and, optionally, one or more monoalkenyl arene compounds. Preferably, at least 80 mole % of the monomer mixture comprises isoprene.

Specific examples of suitable additional conjugated diene monomers include 1,3-butadiene; 1,3-pentadiene (piperylene); 2,3-dimethyl-1,3-butadiene; 3-butyl-1,3-octadiene, 1-phenyl-1,3-butadiene; 1,3-hexadiene; and 4-ethyl-1,3-hexadiene with butadiene being preferred. Apart from the one or more conjugated dienes the living polymers may also be partly derived from one or more monoalkenyl arene compounds. Preferred monoalkenyl arene compounds are the monovinyl aromatic compounds such as styrene, monovinylnaphthalene as well as the alkylated derivatives thereof such as o-, m- and p-methylstyrene, alpha-methylstyrene and tertiary-butylstyrene. Styrene is the preferred monoalkenyl arene compound. The living polymer may also be partly derived from small amounts of other monomers such as monovinylpyridines, alkyl esters of acrylic and methacrylic acids (e.g. methyl methacrylate, dodecyclmethacrylate, octadecyclmethacrylate), vinyl chloride, vinylidene chloride, monovinyl esters of carboxylic acids (e.g. vinyl acetate and vinyl stearate). Preferably, the living polymers are derived entirely from hydrocarbon monomers. If a monoalkenyl arene compound is used in the preparation of the living polymers it is preferred that the amount thereof be below about 70% by weight. More in particular, if the monoalkenyl arene compound is polymerized in blocks, the block or blocks of poly(monoalkenyl arene) in the final coupled polymer preferably comprise no more than 50% by weight, preferably no more than 35% by weight on the weight of the coupled polymer.

The living polymers may be living homopolymers based on a conjugated diene, living copolymers, living terpolymers, living tetrapolymers, etc. The living homopolymers based on a conjugated diene may be represented by the formula B-M, wherein M is a carbanionic group, e.g. lithium, and B is polybutadiene or polyisoprene. The living copolymers may be represented by the formula B'-M, wherein B' is a block random or tapered copolymer such as poly(butadiene/isoprene), poly(butadiene/styrene) or poly(isoprene/styrene). The living copolymer may also be represented by the formula A-B-M, wherein A is a polystyrene block. Combinations and living copolymers with a greater number of blocks are within the scope of this invention.

As stated above, the living copolymers may be living block copolymers, living random copolymers or living tapered copolymers.

Living block copolymers are made by polymerizing a first monomer to full completion, and then adding an alternative monomer. Thus, the living block copolymers may be prepared by the step-wise polymerization of the monomers e.g. by polymerizing isoprene to form living polyisoprene followed by the addition of another monomer, e.g. styrene, to form a living block copolymer having the formula polyisoprene-polystyrene-M, or styrene may be polymerized first to form living polystyrene followed by addition of isoprene to form a living block copolymer having the formula polystyrene-polyisoprene-M. The living copolymers may also have a controlled distribution of monomers in the midblock B, for instance having the formula polystyrene-poly(butadiene/styrene)-M, wherein the relative content of styrene in the poly(butadiene/styrene) copolymer block is low where it is closest to the polystyrene block.

The living random copolymers may be prepared by adding gradually the most reactive monomer to the polymerization reaction mixture, comprising either the less reactive monomer or a mixture of the monomers, in order that the molar ratio of the monomers present in the polymerization mixture be kept at a controlled level. It is also possible to achieve this randomization by gradually adding a mixture of the monomers to be copolymerized to the polymerization mixture. Living random copolymers may also be prepared by carrying out the polymerization in the presence of a so-called randomizer, as discussed hereinafter.

Living tapered copolymers are prepared by polymerizing a mixture of monomers and result from the difference in reactivity between the monomers. For example, if monomer A is more reactive than monomer B then the composition of the copolymer gradually changes from that of nearly pure poly-A to that of nearly pure poly-B. Therefore, in each living copolymer molecule three regions can be discerned, which gradually pass into each other, and which have no sharp boundaries. One of the outer regions consists nearly completely of units derived from monomer A and contains only small amounts of units derived from monomer B, in the middle region the relative amount of units derived from monomer B greatly increases and the relative amount of units derived from monomer A decreases, while the other outer region consists nearly completely of units derived from monomer B and contains only small amounts of units derived from monomer A. Living tapered copolymers of butadiene and isoprene are preferred living tapered polymers.

Preferably, the living polymer is derived entirely from isoprene, thereby closely resembling NR.

The solvents in which the living polymer is formed are inert liquid solvents such as hydrocarbons e.g. aliphatic hydrocarbons, such as pentane, hexane, heptane, oxtane, 2-ethylhexane, petroleum ether, nonane, decane, cyclopentane, cyclohexane, methylcyclohexane or aromatic hydrocarbons e.g. benzene, toluene, ethylbenzene, the xylenes, diethylbenzenes, propylbenzenes. In general cyclohexane is a preferred solvent. Mixtures of hydrocarbons e.g. lubricating oils may also be used.

The temperature at which the polymerization of conjugated dienes is carried out may vary between wide limits such as from −50° C. to 150° C. Typically, temperatures of 0 to 100° C. for small-scale and up to 150° C. for large-scale operations may be used for reaction times of 3 to 60 hours. However, due to the presence of the comonomer preferably the polymerization is carried out from about 20° to about 60° C. The reaction is suitably carried out in an inert atmosphere such as nitrogen and may be carried out under pressure e.g. a pressure of from about 0.5 to about 10 bars.

In particular for the preparation of polyisoprene according to the current invention, the initiation and polymerization is carried out under pressure at a temperature preferably in the range of from 40 to 60° C. The polymerization is generally carried out for a time sufficient to achieve at least 99% conversion of the monomer feed. This may be achieved within about 1 hour or even less.

The polymerization according to the present invention is carried out in the presence of the selected comonomer. The comonomer may be present at the beginning of the polymerization or dosed gradually or at stages.

To achieve a reasonable degree of branching, while avoiding gelation, only small amounts of comonomer are needed. Generally, the amount of comonomer is less than 2.0 mole % of the monomer mixture. Amounts of from 0.01 to 1.5 mole %, preferably from 0.1 to 1.0 mole % are preferred. The amount, which may be added in a single shot or more stages, is usually such so as to avoid multiple double bonding of the comonomer.

The molecular weight of the living polymers prepared in reaction step (a) may vary between wide limits. Preferably, the number average molecular weight is at least 45,000. High molecular weights are preferred, albeit that one has to consider the (very) high viscosity of the solutions of such polymers. Suitable number average molecular weights are from about 45,000 to about 2,000,000 with number average molecular weights of from about 200,000 to about 1,000,000 being preferred.

As used in this specification and claims, the term molecular weight refers to polystyrene equivalent, or apparent, molecular weight of the polymer or block of the copolymer, measured with gel permeation chromatography (GPC) using polystyrene calibration standards, such as is done according to ASTM D5296-11. GPC is a well-known method wherein polymers are separated according to molecular size, the largest molecule eluting first. The chromatograph is calibrated using commercially available polystyrene molar mass standards. The detector used is preferably a combination ultraviolet and refractive index detector. The molecular weight expressed herein is expressed as number average molecular weight (Mn) or weight average molecular weight (Mw). The molecular weight distribution (D) is expressed as the ratio of Mw over Mn. The ratio of the Mn for a coupled polymer over the Mn of the uncoupled precursor polymer is indicated as apparent degree of branching (DoB). This apparent degree of branching is in general lower than the "real" number of polymer arms, as the GPC method separates on the basis of molecular size as indicated above.

The living polymer may be prepared by carrying out the polymerization in the presence of a so-called randomizer. Randomizers are polar compounds which do not deactivate the catalyst and bring about a tendency to random copolymerization. Suitable randomizers are tertiary amines, such as trimethylamine, triethylamine, dimethylethylamine, tri-n-propylamine, tri-n-butylamine, dimethylaniline, pyridine, quinoline, N-ethylpiperidine, N-methylmorpholine; thioethers, such as dimethyl sulphide, diethyl sulphide, di-n-propyl sulphide, di-n-butyl sulphide, methyl ethyl sulphide; and in particular ethers, such as dimethyl ether, methyl ethyl ether, diethyl ether, di-n-propyl ether, di-n-butyl ether, di-octyl ether, di-benzyl ether, di-phenyl ether, anisole, 1,2-dimethyloxyethane, o-dimethoxy benzene, and cyclic ethers such as tetrahydrofuran. Generally, the amount of randomizer is small, to avoid overreacting the comonomer. Moreover, the amount depends on the randomizer. In general, amounts of from 0.1 to 8.0% by weight on the monomer mixture, preferably from 0.5 to 5.0 by weight on the monomer mixture are preferred, and from 1.0 to 3.0% by weight on the monomer mixture is more preferred.

After the desired extend of polymerization has been attained, a short stop or catalyst deactivator is added to the cement that is formed by the polymer in the solvent. An antioxidant may be added to protect the polymer during finishing and storage.

In a next step, the cement comprising the solvent and polymer is typically put through a stripping operation, whereby the solvent is recovered and the polymer cement is converted to a crumb by hot water and steam. The crumb slurry is typically processed through extruders to remove water before it is cooled, baled, packaged and placed in storage ready for shipment.

Alternatively, a conjugated diene polymer latex may be prepared via a post emulsification process. In this case the conjugated diene polymer is dissolved in a suitable solvent and blended with an aqueous soap solution in a high shear emulsification apparatus. The resulting intermediate product is a highly diluted emulsion with a high amount of organic solvent. The solvent contained in the emulsion is stripped, and subsequently the diluted emulsion is concentrated to produce the conjugated diene polymer latex. The process parameters for this step are known.

From various documents such as WO Pat. Nos. 2008074513, 2007110417, and 2010005895 processes are known for the preparation of an artificial latex. Generally, the process comprises the steps of forming a cement by dissolving a conjugated diene polymer (synthetic rubber) in a suitable hydrocarbon solvent, emulsifying this to form an oil-in-water emulsion, removing the hydrocarbon solvent and (optionally) concentrating the latex. This may also be carried out with the conjugated diene polymers of the present invention.

The invention is described with respect to 1,2-bis(vinylphenyl)ethane, or BVPE. However, it is noted that the principle applies to alpha,omega-bis(vinylphenyl)alkanes, wherein the alkane group has at least one carbon atom, preferably 2 carbon atoms and more preferably no more than 20 carbon atoms. The alkane group may be linear or branched. Moreover one or more of the carbon atoms may be substituted by nitrogen, silicon or oxygen atoms. The alkane group may be substituted, for instance with a further vinylphenylalkyl group. Most preferably, the alkane group is composed of two carbon atoms.

The vinyl group(s) on the alpha,omega-bis(vinylphenyl)alkane may be in ortho, para or meta position. Preferably they are in para or meta position. The vinyl groups may each be in the same or in a different position.

It is of particular interest that the comonomer used in the present invention does not suffer from impurities. For instance, p,p'-BVPE or 1,2-bis(p-vinylphenyl)ethane can be synthesized in high purity by Grignard coupling of p-vinylbenzylchloride, which is a commercially available starting material.

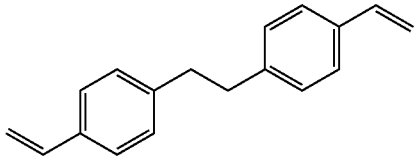

FIG. 1. 1,2-bis(p-vinylphenyl)ethane (p,p'-BVPE)

BVPE or 1,2-bis(vinylphenyl)ethane is little explored as comonomer in anionic polymerization. The living anionic copolymerisation of styrene with BVPE or p-divinylbenzene (PDVB) with sec-butyllithium in benzene was carried out by Endo, Takeshi; Ohshima, Akira; Nomura, Ryoji; Mizutani, Yukio, "Synthesis of networked polystyrene endowed with nucleophilic reaction sites by the living anionic polymerization technique", in Journal of Polymer Science, Part A: Polymer Chemistry (2000), 38(14), 2543-2547.

As indicated above, it is desirable to produce branched broad molecular weight distribution conjugated diene polymers, and polyisoprene in particular by anionic techniques. In none of the prior art discussed hereinbefore this has been described.

A conventional solution would be to include divinylbenzene or DVB as comonomer. However, DVB has been found to perform poorly. Thus, DVB results in near immediate gelation and/or formation of a DVB core acting as a multifunctional coupling agent. The star-shaped polymers so obtained are obviously different from NR. Moreover, DVB is relatively impure. This may adversely affect the degree of polymerization of the conjugated diene.

Surprisingly it has been found that BVPE offers real possibilities to produce branched broad MWD conjugated diene polymer by anionic techniques. It has the advantage over divinylbenzene (DVB) that it can be obtained in high purity. By varying the concentration of the monomer, the isomer temperature, selection and amount of randomizer and temperature, the reactivity can be better controlled.

As indicated, BVPE can be synthesized in high purity by Grignard coupling of vinylbenzylchloride (VBC), which is a commercially available starting material. When p-VBC is applied as starting material it results into the pure 1,2-bis (p-vinylphenyl)ethane. Alternatively, when a mixture of p- and m-VBC is applied, the result is a mixture of three isomers of BVPE, i.e. the p,p', p,m and m,m'-isomers. The p,p'-isomer is a crystalline solid with a melting point of ca. 96° C. When using a p/m-VBC mixture as starting material, the resulting mixture of BVPE isomers can be crystallized in order to get a p,p'-isomer rich fraction and a fraction that is rich in the p,m and m,m' isomers.

BVPE was investigated as two different compositions: the pure p,p'-isomer which is a crystalline solid and a mixture of isomers (consisting of mostly p,m- and m,m'-isomers) which makes a hydrocarbon soluble liquid. Both compositions have advantages. Thus, the crystalline BVPE is very stable and does not require a stabilizer for long term storage. The mixture of isomers requires such a stabilizer to prevent polymerization on standing, but does not have to be dissolved to be used in step (b) as it is a liquid. It also has a higher hydrocarbon solubility as compared to the crystalline p,p'-isomer. Also of interest is that by controlling the ratio of isomers in the mixture, its behaviour may be varied. Thus, the p,p'-isomer more quickly and/or completely reacts, whereas a greater degree of linear polymers may be made with the p,m- and m,m'-isomers.

BVPE thus offers greater control in reactivity than DVB, in particular as the purity of its composition may be changed. It is therefore possible to form branched broad MWD polyisoprene by using BVPE as comonomer.

Thus, with regular technologies, branched polyisoprene can only be produced via coordination polymerization applying neodymium or Ziegler-Natta based catalysts. The use of BVPE brings this feature within reach by anionic polymerization technology. Branched polyisoprene structures have in general the advantage of improved processing characteristics as compared to linear structures. This can now be combined with the tight molecular weight control and the cleanliness of products resulting from the anionic polymerization technology.

The invention further relates to a latex of the branched broad MWD conjugated diene polymer, wherein the polymer made above is converted into an aqueous emulsion. This may be done by combining a solution of the new polymer in an organic solvent with water and a soap, and removing the organic solvent. A homogenizer or series of homogenizers may be used to ensure the latex is stable and the polymer particles therein are small.

The latex so produced may be used for the preparation of dipped goods, such as condoms and surgical gloves. Dipped goods are made by dipping an appropriate form in the latex and drying and curing the same.

The invention is illustrated by the examples hereafter.

EXAMPLES

BVPE used in the following examples was purchased from Shepherd Chem. Co. USA. Two different grades were available, i.e. the pure solid p,p' isomer and a liquid mixture of p,p', p,m and m,m' isomers. Both grades are characterized by NMR and GCMS. Composition data are provided in Table 1 below:

TABLE 1

| BVPE grade | Purity (GCMS) (%) | Physical state | p,p' (%) | p,m (%) | m,m' (%) |
|---|---|---|---|---|---|
| p,p'-isomer | 98.4 | crystalline solid | 100 | | |
| isomer mixture | 99.7 | clear liquid | 10 | 64 | 26 |

$^1$H NMR data on p,p'-BVPE in CDCl3: δ (CH2) 2.92 ppm, δ (Aryl) 7.15, 7.35 ppm, δ(Vinyl) 5.22, 5.73, 6.72 ppm.

Gel Permeation Chromatography (GPC) data is used to determine the molecular weights of a polymer product. These GPC determinations were carried out using polystyrene calibration standards, in accordance to ASTM D5296-11.

Bottle Polymerizations

The tests described here were carried out at room temperature in 250 mL Duran™ pressure bottles equipped with a stirring bar and appropriate septa. Prior to the experiments the bottles were rinsed with deionized water and dried overnight in a stove at 150° C. The hot bottles were transferred to a drybox to cool down under nitrogen before use.

Experiment 1 (Copolymerization BVPE with Isoprene)

Copolymerization of BVPE with isoprene (IPM) was carried out at 2, 4 and 6% wt. (0.58, 1.16 and 1.74 mole %) on isoprene at room temperature. One polymerization without BVPE served as reference. After initiation the 2% wt. BVPE polymerization turned pink to reddish, whereas the higher BVPE content polymerizations turned yellowish. The reference was colourless. After 5 h of polymerization all BVPE containing mixtures had a yellow colour, with more intensity towards the higher BVPE levels. Basis visual observation the viscosity of the mixtures also increased with BVPE content. Samples were taken for Gel Permeation Chromatography (GPC) and polymerization was allowed to continue overnight at room temperature.

After 22 h the BVPE containing mixtures were all deep orange. The reference and the 2% BVPE mixture were still fluid. The 4 and 6% wt. BVPE mixtures had become a gel. To all bottles a mixture of antioxidant (Butylated Hydroxy-Toluene, available as Ionol™ CP) and methanol (MeOH) was added and samples were taken for GPC. The data in Table 2 below show an ongoing MWD broadening/coupling in time and with increasing percentage of BVPE. The reference had a narrow MWD. After 22 h the 2% BVPE sample was still soluble in THF, whereas the gels formed at 4 and 6% wt. of BVPE were only partly soluble in THF. The GPC of the fully soluble 2% BVPE sample clearly shows the MWD broadening caused by branching and coupling. It also shows that preferably less than 3% wt. (0.87 mole %) of BVPE is used.

TABLE 2

Copolymerization results of BVPE with isoprene.

| BVPE % wt. (on IPM) | Mw 5 h | Mw/Mn 5 h | Soluble % 5 h | Mw 22 h | Mw/Mn 22 h | Soluble % 22 h |
|---|---|---|---|---|---|---|
| 0 | 42 | 1.07 | 100 | 46.4 | 1.07 | 100 |
| 2 | 66 | 1.12 | 100 | 238 | 2.11 | 100 |

TABLE 2-continued

Copolymerization results of BVPE with isoprene.

| BVPE % wt. (on IPM) | Mw 5 h | Mw/Mn 5 h | Soluble % 5 h | Mw 22 h | Mw/Mn 22 h | Soluble % 22 h |
|---|---|---|---|---|---|---|
| 4 | 80 | 1.2 | 100 | 326.8 | 2.42 | 59 |
| 6 | 121 | 1.35 | 100 | 224.8 | 1.76 | 33 |

All molecular weights in kD apparent relative to PS standards

In another series of experiments (A, B and C) 5 bottles were filled with 90 g of dry cyclohexane, ca. 10 g of isoprene and an amount of diethyl ether ($Et_2O$) as indicated in Table 3 below. Beforehand, to four of the bottles a quantity of BVPE was added at levels indicated in Table 3. The fifth bottle served as a polyisoprene reference. Polymerization was initiated under stirring at room temperature or at 50° C. by addition of ca. 2.5 mL of a 0.25-0.30 M solution of s-BuLi in cyclohexane. In series B a reinitiation was carried out by addition of a stoichiometric amount of MeOH and a subsequent aliquot of s-BuLi in cyclohexane. Regular conversion samples from each bottle were taken in BHT/MeOH at different stages of the polymerization.

TABLE 3

BVPE and $Et_2O$ levels applied in copolymerizations with isoprene.

| Exp series | BVPE (mole % IPM) | $Et_2O$ (% w) |
|---|---|---|
| A | 0.25-0.5 | 5 |
| B | 0.3-1.2 | 0.5 |
| C | 0.25-0.5 | 0.05 |

In order to distribute the BVPE units evenly, diethyl ether addition was applied as a modifier. The series of polymerizations given in Table 4 below was mainly varied with respect to BVPE level, diethyl ether level and temperature applied. In series B the polymerization was terminated after ca 80% of conversion and subsequently reinitiated; this procedure allowed the application of higher BVPE levels without gelation problems.

As becomes clear from Table 4, the molecular weight distributions become broader with application of higher levels of BVPE and also with application of higher temperatures. This leads to the impression that at lower temperatures the copolymerization reaction is preponderant over the cross-linking reaction, but at higher temperatures the "anionic curing rate" increases. Therefore, at full conversion in most cases a temperature increase was applied to observe the effect of a complete BVPE double bond conversion. The tendency for gel formation should always be taken into account and becomes more pronounced at BVPE/polymer chain levels>2. This is a plausible number as above 2 cross-links "wall to wall" structures can be formed. One striking example is run A V which gave a complete insoluble gel after only 30 min of polymerization.

Note in this respect that this experiment is not optimized, and that examples within the scope of the invention currently forming a gel, may be performed without gelation by optimizing the polymerization conditions.

For all experiments given in Table 4 below conversion samples were taken at regular intervals (Table 4 gives the GPC data of the end samples only).

From series A it was found that a relatively high level of diethyl ether (5% wt.) induces a BVPE polymerization which is faster than the isoprene conversion. BVPE will as such be built in primarily at the beginning of the polymerization. The BVPE fate shows a logical pattern, with in the end a complete reaction of both BVPE functionalities.

In series B (0.5% wt. of diethyl ether) the copolymerization seems to be better in balance and "random" copolymers have been made. These reinitiated runs were carried out mainly at room temperature with at the end a short 30 min "cure" at 50° C. This was clearly not enough to convert all functionality of BVPE. This reinitiation was carried out by a stoichiometric addition of MeOH and subsequent initiation with 2-BuLi with the objective to avoid gelation at the end of the polymerization.

Finally, in series C at 0.05% wt. diethyl ether the isoprene conversion is the fastest one as was already observed in experiments without diethyl ether. Temperatures were higher than in the previous series, leading to much higher conversion of BVPE functionality than in the previous series.

Experiment 3 (Branched PS_PI Diblocks)

In another series of experiments copolymerizations of BVPE and styrene in cyclohexane were carried out without addition of a randomizer Data are provided in Table 5. In the D series an Mn of 4500-5000 was targeted, whereas in the E series this was 7000-8000. At 1-2 mole % on styrene, achieves between 0.5 and 1.5 BVPE units per chain. In these cases MWD broadening took place, but all polymers remained soluble. At the 4 mole % BVPE level (series E) we obtained insoluble polystyrene at room temperature. At 50° C. a polystyrene with a strongly inflated molecular weight was obtained with also broad MWD (Mw/Mn=1.84). This highly branched/insoluble polymer has approximately 2-3 BVPE units per chain. The polymerizations were continued with the addition of isoprene to give the corresponding PS-PI diblock copolymers. This resulted in polymer solutions with either high (H) or even very high (VH) viscosities. The diblocks represent sticky materials.

TABLE 4

Copolymerization results of BVPE with isoprene at full conversion.

| Exp | BVPE/IPM mole % | Et2O % | s-BuLi mmole | BVPE/chain estimate | Temp ° C. | Time h | Mw | Mn | Mw/Mn | 3,4% | Viscosity |
|---|---|---|---|---|---|---|---|---|---|---|---|
| A I | 0 | 5 | 0.4 | 0 | 25 | 5 | 48 | 47 | 1.02 | 43 | L |
| A II | 0.25 | 5 | 0.4 | 1 | 25/50 | 4 | 83 | 44 | 1.9 | 43 | H |
| A III | 0.5 | 5 | 0.4 | 2 | 25/50 | 4 | 306 | 81 | 3.8 | 43 | VH |
| A IV | 0.25 | 5 | 0.4 | 1 | 50 | 1.5 | 307 | 83 | 3.69 | 43 | VH |
| A V | 0.5 | 5 | 0.4 | 2 | 50 | 0.5 | — | — | — | 43 | Gel |
| B I | 0 | 0.5 | 0.4 | 0 | 25 | 6 | 44 | 42 | 1.04 | 25 | L |
| B II* | 0.3 | 0.5 | 0.4 | 1 | 25/50 | 6.5 | 41 | 26 | 1.56 | 25 | L |
| B III* | 0.6 | 0.5 | 0.4 | 2 | 25/50 | 6.5 | 52 | 22 | 2.35 | 25 | H |

TABLE 4-continued

Copolymerization results of BVPE with isoprene at full conversion.

| Exp | BVPE/IPM mole % | Et2O % | s-BuLi mmole | BVPE/chain estimate | Temp ° C. | Time h | Mw | Mn | Mw/Mn | 3,4% | Viscosity |
|---|---|---|---|---|---|---|---|---|---|---|---|
| B V* | 1.2 | 0.5 | 0.4 | 4 | 25/50 | 6.5 | 345 | 68 | 5.06 | 25 | VH |
| C I | 0 | 0.05 | 0.45 | 0 | 50 | 1.5 | 41 | 40 | 1.03 | 7.6 | L |
| C II | 0.25 | 0.05 | 0.45 | 1 | 50/65 | 1.5 | 229 | 113 | 2.01 | 7.6 | H |
| C III | 0.5 | 0.05 | 0.45 | 2 | 50/65 | 1.5 | 589 | 135 | 4.35 | 7.6 | VH |
| C IV | 0.25 | 0.05 | 0.3 | 1.5 | 50/65 | 1.5 | 504 | 173 | 2.9 | 7.6 | VH |
| C V | 0.5 | 0.05 | 0.3 | 3 | 50/65 | 1.5 | — | — | — | 7.6 | VH/Gel |

All molecular weights in kD apparent relative to PS standards
*Reinitiated after ca. 80% conversion by stoichiometric MeOH kill/s-BuLi addition of 0.45 mmole
L = liquid;
H = high;
VH = very high

TABLE 5

Copolymerization results of BVPE with styrene and further polymerization to PS-PI diblocks.

| | | | PS-block | | | | | PS-PI diblock | | | |
|---|---|---|---|---|---|---|---|---|---|---|---|
| Exp | BVPE/IPM mole % | Temp ° C. | Time h | Mw | Mn | Mw/Mn | Sty/IPM mole % | Temp ° C. | Time h | Viscosity | Mw | Mn | Mw/Mn |
| D I | 0 | 25 | 5 | 4.32 | 4.07 | 1.06 | | | | | | | |
| D II | 1 | 25 | 5 | 6.21 | 5.31 | 1.17 | 1/3 | 50 | 1.5 | VH | 53 | 46 | 1.16 |
| D III | 2 | 25 | 5 | 10.25 | 8.04 | 1.27 | 1/3 | 50 | 1.5 | VH | 63 | 55 | 1.14 |
| E I | 0 | 50 | 6 | 7.82 | 7.58 | 1.03 | | | | | | | |
| E II | 2 | 50 | 2 | 10.12 | 7.99 | 1.27 | 1/3 | 50 | 1.5 | H | 52 | 45 | 1.16 |
| E III | 4 | 50 | 2 | 26.67 | 14.52 | 1.84 | 1/3 | 50 | 1.5 | VH | 103 | 81 | 1.27 |

All molecular weights in kD apparent relative to PS standards
L = liquid;
H = high;
VH = very high The results confirm that the presence of a randomizer such as diethyl ether is preferred to get random copolymerization. At ca 0.5% of diethyl ether this results in branched polyisoprenes with a 3.4 content of 25%. Temperatures above 50° C. and the presence of diethyl ether promote the complete conversion of all BVPE functionality. Preferably no more than 3% wt. randomizer is used.

It is speculated on the basis of the overall NMR data, correlated with the GPC data of the various (intermediate) polyisoprene samples, that the MWD broadening takes place when most of the BVPE is reacted away and converted into "cross-links" between different polymer chains.

Observations

The synthesis of branched polymers by the copolymerization of BVPE with isoprene has clearly been demonstrated. Preferably, this type of branching by "molecular weight inflation" involves a strict control of the polymerization conditions in order to avoid gel formation. In the molecular weight ranges tested here the number of BVPE units per chain is preferably limited to a maximum of ca. 2.

It has been observed that at room temperature the polymerization reaction preferentially takes place initially, whereas the branching starts to become more pronounced at monomer depletion.

Most of the polyisoprenes prepared here are relatively low molecular weight (Mw<100,000) and represent viscous sticky liquids. The higher molecular weight products (apparent Mw 300,000-550,000) have very broad distributions and represent more (high 3,4-content, series A and B) or less (low 3,4-content, series C) sticky solids.

In view of the experiments described above it can be concluded that branched conjugated diene polymers can be prepared via anionic polymerization using small amounts of BVPE as comonomer.

The invention claimed is:

1. A process for preparing a branched conjugated diene polymer with a molecular weight distribution Mw/Mn of at least 1.1, by anionic polymerization, comprising the following reaction steps:
   a) polymerizing a mixture of monomers comprising at least one conjugated diene and optionally one or more monoalkenyl arene compounds in the presence of an anionic initiator to form a living polymer;
   b) terminating the polymerization, and
   c) optionally functionalizing and/or hydrogenating the polymer so produced,
   wherein the mixture of monomers comprises an alpha, omega-bis(vinylphenyl)alkane as comonomer.

2. The process of claim 1, wherein the comonomer is 1,2-bis(vinylphenyl)ethane.

3. The process of claim 1, wherein the comonomer is used in an amount of less than 2.0 mole % of the monomer mixture.

4. The process of claim 1, wherein the living polymer is prepared by carrying out the polymerization in the presence of a randomizer.

5. The process of claim 4, wherein the randomizer is a tertiary amine and selected from the group consisting of trimethylamine, triethylamine, dimethylethylamine, tri-n- propylamine, tri-n-butylamine, dimethylaniline, pyridine, quinoline, N-ethylpiperidine, N-methylmorpholine.

6. The process of claim 4, wherein the randomizer is a thioether selected from the group consisting of dimethyl sulphide, diethyl sulphide, di-n-propyl sulphide, di-n-butyl sulphide, methyl ethyl sulphide.

7. The process of claim 4, wherein the randomizer is an ether selected from the group consisting of dimethyl ether, methyl ethyl ether, diethyl ether, di-n-propyl ether, di-n-butyl ether, di-octyl ether, di-benzyl ether, di-phenyl ether, anisole, 1,2-dimethyloxyethane, o-dimethoxy benzene, and tetrahydrofuran.

8. The process of claim 4, wherein the amount of randomizer is from 0.1 to 8.0% by weight on the monomer mixture.

9. The process of claim 1, wherein the polymerization is carried out at a temperature from about 20 to about 60° C.

10. The process of claim 1, wherein the conjugated diene is isoprene or a mixture of monomers comprising at least 80 mole % isoprene.

11. A branched conjugated diene polymer, with a molecular weight distribution Mw/Mn of at least 1.1, comprising an alpha,omega-bis(vinylphenyl)alkane built-in as comonomer in the polymer backbone.

12. A process for preparing a conjugated diene polymer latex, by combining a solution of the branched conjugated diene polymer of claim 11 in an organic solvent with water and a soap, and removing the organic solvent.

13. A conjugated diene polymer latex comprising a branched conjugated diene polymer emulsified in water, wherein the conjugated diene polymer is a branched conjugated diene polymer, with a molecular weight distribution Mw/Mn of at least 1.1, comprising an alpha,omega-bis (vinylphenyl)alkane built-in as comonomer in the polymer backbone.

14. An article made from the conjugated diene polymer latex of claim 13 made by dipping.

* * * * *